(12) United States Patent
Edirisooriya

(10) Patent No.: US 7,330,998 B2
(45) Date of Patent: Feb. 12, 2008

(54) DATA INTEGRITY VERIFICATION

(75) Inventor: Samantha J. Edirisooriya, Tempe, AZ (US)

(73) Assignee: Intel Corporation, Santa Clara, CA (US)

( * ) Notice: Subject to any disclaimer, the term of this patent is extended or adjusted under 35 U.S.C. 154(b) by 526 days.

(21) Appl. No.: 10/945,741

(22) Filed: Sep. 20, 2004

(65) Prior Publication Data

US 2006/0075280 A1   Apr. 6, 2006

(51) Int. Cl.
*G06F 11/00*   (2006.01)

(52) U.S. Cl. .......................... 714/6; 714/770
(58) Field of Classification Search .................. 714/6, 714/746, 758, 770
See application file for complete search history.

(56) References Cited

U.S. PATENT DOCUMENTS

| | | | |
|---|---|---|---|
| 5,271,012 | A | 12/1993 | Blaum et al. |
| 5,579,475 | A | 11/1996 | Blaum et al. |
| 6,023,780 | A * | 2/2000 | Iwatani ..................... 714/770 |
| 6,247,157 | B1 | 6/2001 | Edirisooriya |
| 6,480,970 | B1 * | 11/2002 | DeKoning et al. ............. 714/6 |
| 6,981,171 | B2 * | 12/2005 | Hashemi ...................... 714/5 |
| 2002/0169995 | A1 * | 11/2002 | Archibald et al. ............. 714/6 |

OTHER PUBLICATIONS

David A. Patterson, et al, "A Case For Redundant Arrays Of Inexpensive Disks (RAID)", Dept. of EE & Computer Sciences, Univ. of CA, 1988, pp. 109-116.

Walter A. Burkhard, et al., "Disk Array Storage System Reliability", IEEE, 1993, pp. 432-441.

Chan-Ik Park, "Efficient Placement Of Parity And Data To Tolerate Two Disk Failures In Disk Array Systems", IEEE, vol. 6, No. 11, Nov. 1995, pp. 1177-1184.

Mario Blaum, et al., "Evenodd: An Efficient Scheme For Tolerating Double Disk Failures In RAID Architectures", IEEE Trans. Computers, vol. 44, No. 2, Feb. 1995, pp. 192-202.

Garth A. Gibson, et al., "Coding Techniques For Handling Failures In Large Disk Arrays1", Computer Sciences Division, Univ. of CA, Dec. 1988, pp. 1-29.

T10/03-365 rev. 1; Nov. 6, 2003, pp. 1-43.

* cited by examiner

*Primary Examiner*—Marc Duncan
(74) *Attorney, Agent, or Firm*—Blakely, Sokoloff, Taylor & Zafman LLP

(57) ABSTRACT

In one embodiment, a method is provided. The method of this embodiment may include verifying, at least in part, integrity of first check data and a plurality of data blocks. The first check data may be generated based at least in part upon the plurality of data blocks. The verifying may be based, at least in part, upon second check data and third check data. The second check data may be generated based at least in part upon respective check data. The respective check data may be generated based at least in part upon respective data blocks comprised in the plurality of data blocks. The third check data may be generated based at least in part upon the first check data. Of course, many alternatives, variations, and modifications are possible without departing from this embodiment.

20 Claims, 2 Drawing Sheets

DATA INTEGRITY VERIFICATION

FIELD

This disclosure relates to the field of data integrity verification.

BACKGROUND

In one conventional data storage arrangement, a redundant array of inexpensive disks (RAID) includes a set of associated data blocks and an associated parity block. Each of the data blocks in the set, and the parity block, is associated with a respective block guard stored in the RAID that includes a respective cyclic redundancy check value. In this conventional data storage arrangement, after one of the data blocks in the set in the RAID is overwritten (e.g., with new user data), first circuitry in the conventional data storage arrangement recalculates the CRC values of the respective data blocks. Thereafter, the corresponding parity block in the RAID is overwritten with new parity data, and the CRC value associated with the parity block is overwritten in the RAID with the CRC value of the new parity data. The new parity data is calculated by second circuitry in the RAID as the result of a logical exclusive-or operation that involves, as operands, of each of the data blocks in the set.

Unfortunately, in this conventional storage arrangement, the operations involved in the verification of the integrity of the data blocks may take an undesirably large amount of time to perform. Additionally, in this conventional arrangement, in order to facilitate the ability of the first circuitry to re-calculate the CRC values of the data blocks prior to the second circuitry calculating the new parity data based on the data blocks, the first circuitry may constitute a processing stage in the input data path of the second circuitry through which the data blocks propagate prior to being input into the second circuitry. Disadvantageously, this may result in the first and second circuitry being more complex than desired.

BRIEF DESCRIPTION OF THE DRAWINGS

Features and advantages of embodiments of the claimed subject matter will become apparent as the following Detailed Description proceeds, and upon reference to the Drawings, wherein like numerals depict like parts, and in which:

Although the following Detailed Description will proceed with reference being made to illustrative embodiments, many alternatives, modifications, and variations thereof will be apparent to those skilled in the art. Accordingly, it is intended that the claimed subject matter be viewed broadly, and be defined only as set forth in the accompanying claims.

DETAILED DESCRIPTION

Figure 1:
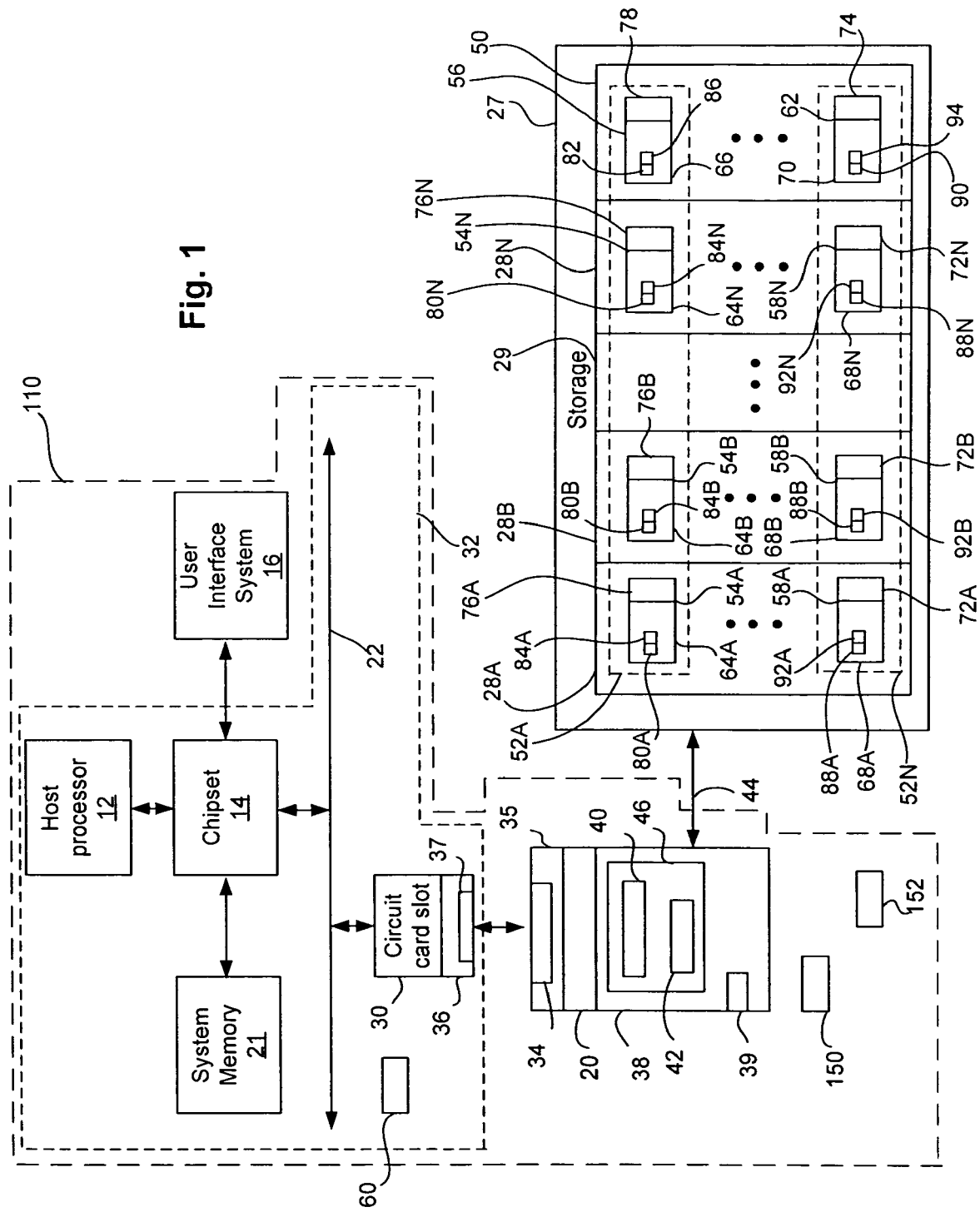
FIG. 1 illustrates a system embodiment.

FIG. 1 illustrates a system embodiment 100. System 100 may include a host processor 12 coupled to a chipset 14. Host processor 12 may comprise, for example, an Intel® Pentium® IV microprocessor that is commercially available from the Assignee of the subject application. Of course, alternatively, host processor 12 may comprise another type of microprocessor, such as, for example, a microprocessor that is manufactured and/or commercially available from a source other than the Assignee of the subject application, without departing from this embodiment.

Chipset 14 may comprise a host bridge/hub system that may couple host processor 12, a system memory 21 and a user interface system 16 to each other and to a bus system 22. Chipset 14 may also include an input/output (I/O) bridge/hub system (not shown) that may couple the host bridge/bus system to bus 22. Chipset 14 may comprise one or more integrated circuit chips, such as those selected from integrated circuit chipsets commercially available from the assignee of the subject application (e.g., graphics memory and I/O controller hub chipsets), although one or more other integrated circuit chips may also, or alternatively be used, without departing from this embodiment. User interface system 16 may comprise, e.g., a keyboard, pointing device, and display system that may permit a human user to input commands to, and monitor the operation of, system 100.

Bus 22 may comprise a bus that complies with the Peripheral Component Interconnect (PCI) Express™ Base Specification Revision 1.0, published Jul. 22, 2002, available from the PCI Special Interest Group, Portland, Oreg., U.S.A. (hereinafter referred to as a "PCI Express™ bus"). Alternatively, bus 22 instead may comprise a bus that complies with the PCI-X Specification Rev. 1.0a, Jul. 24, 2000, available from the aforesaid PCI Special Interest Group, Portland, Oreg., U.S.A. (hereinafter referred to as a "PCI-X bus"). Also alternatively, bus 22 may comprise other types and configurations of bus systems, without departing from this embodiment.

System embodiment 100 may comprise storage 27. Storage 27 may comprise RAID 29. Storage 27 may be communicatively coupled to an I/O controller circuit card 20 via one or more communication links 44. As used herein, a "communication link" means one or more mechanisms, one or more paths, one or more channels, one or more media, and/or circuitry via which one or more electromagnetic signals and/or electromagnetic radiation may be transmitted and/or received. For example, in this embodiment, one or more communication links 44 may include one or more wired and/or wireless communication links capable of transmitting and/or receiving optical and/or electrical signals. RAID 29 may comprise one or more storage devices, and in this embodiment, RAID 29 may comprise a plurality of storage devices 28A, 28B, . . . 28N, and 50. As used herein, a "storage device" means an apparatus or medium into, and from which, data and/or commands may be stored and retrieved, respectively. In this embodiment, each of the storage devices 28A, 28B, . . . 28N, and 50 may comprise one or more respective mass storage devices. As used herein, a "mass storage device" means a storage device that is capable of non-volatile storage of data and/or commands, and, for example, in this embodiment, may include, without limitation, one or more magnetic, optical, and/or semiconductor storage devices. For example, in this embodiment, each of the storage devices 28A, 28B, . . . 28N, and 50 may comprise one or more respective magnetic and/or optical disk mass storage devices. In this embodiment, card 20 may comprise, for example, a host bus adapter (HBA). The number of storage devices 28A, 28B, . . . 28N, and 50, the number of mass storage devices comprised in RAID 29, and/or the number of communication links comprised in one or more communication links 44 may vary without departing from this embodiment.

For example, in this embodiment, the RAID level that may be implemented in RAID 29 may vary. Depending upon, for example, the RAID level implemented in RAID 29, the number of storage devices 28A . . . 28N, and 50, and/or the number of mass storage devices comprised in RAID 29 may vary so as to permit the number of storage devices 28A . . . 28N, and 50, and/or the number of mass storage devices comprised in RAID 29 to be at least sufficient to implement the RAID level implemented in RAID 29.

System embodiment 100 also may comprise a circuit card slot 30 that may be coupled to bus 22. Processor 12, system memory 21, chipset 14, bus 22, and circuit card slot 30 may be comprised in a single circuit board, such as, for example, a system motherboard 32. Operative host computer system circuitry 110 may comprise system motherboard 32 and user interface system 16. A host computer system (not shown) may comprise operative circuitry 110.

Depending upon, for example, whether bus 22 comprises a PCI Express™ bus or a PCI-X bus, circuit card slot 30 may comprise, for example, a PCI Express™ or PCI-X bus compatible or compliant expansion slot or interface 36. Interface 36 may comprise a bus connector 37 may be electrically and mechanically mated with a mating bus connector 34 that may be comprised in a bus expansion slot or interface 35 in circuit card 20.

Slot 30 and card 20 may be constructed to permit card 20 to be inserted into slot 30. When card 20 is properly inserted into slot 30, connectors 34 and 36 may become electrically and mechanically coupled to each other. When connectors 34 and 36 are so coupled to each other, the operative circuitry 38 of card 20 may become electrically coupled to bus 22 and may exchange data and/or commands with system memory 21, host processor 12, and/or user interface system 16 via bus 22 and chipset 14.

Alternatively, without departing from this embodiment, some or all of operative circuitry 38 may not be comprised in card 20, but instead, may be comprised in other structures, systems, and/or devices. These other structures, systems, and/or devices may be, for example, comprised in motherboard 32, coupled to bus 22, and exchange data and/or commands with other components (such as, for example, system memory 21, host processor 12, and/or user interface system 16) in system 100. For example, without departing from this embodiment, some or all of operative circuitry 38 may be comprised in one or more integrated circuits comprised in chipset 14. Further alternatively, without departing from this embodiment, some or all of operative circuitry 38 may be comprised in storage 27 and/or RAID 29.

As used herein, "circuitry" may comprise, for example, singly or in any combination, hardwired circuitry, programmable circuitry, state machine circuitry, and/or memory, and may store, encode, and/or embody program instructions that may be executed by programmable circuitry. In this embodiment, operative circuitry 38 in card 20 may comprise computer-readable memory 39. Memory 39 and/or memory 21 may comprise one or more of the following types of memories: semiconductor firmware memory, programmable memory, non-volatile memory, read only memory, electrically programmable memory, random access memory, flash memory, magnetic disk memory, and/or optical disk memory. Either additionally or alternatively, memory 39 and/or memory 21 may comprise other and/or later-developed types of computer-readable memory.

Machine-readable program instructions may be stored in memory 39 and/or memory 21. These instructions may be accessed and executed by operative circuitry 38. When executed by circuitry 38, these instructions may result in card 20 and/or circuitry 38 performing the operations described herein as being performed by card 20 and/or circuitry 38.

In this embodiment, circuitry 38 may be capable of exchanging data and/or commands with storage 27 via one or more links 44 in accordance with, e.g., Small Computer Systems Interface (SCSI) protocol, Fibre Channel (FC) protocol, SCSI Over Internet Protocol (iSCSI), Serial Attached SCSI (SAS) protocol, Serial Advanced Technology Attachment (S-ATA) protocol, Ethernet protocol, and/or Transmission Control Protocol/Internet Protocol (TCP/IP). In accordance with this embodiment, if circuitry 38 and storage 27 exchange data and/or commands via one or more links 44 in accordance with SCSI protocol, the SCSI protocol may comply and/or be compatible with the protocol described in American National Standards Institute (ANSI) Small Computer Systems Interface-2 (SCSI-2) ANSI X3.131-1994 Specification. If circuitry 38 and storage 27 exchange data and/or commands via one or more links 44 in accordance with FC protocol, the FC protocol may comply and/or be compatible with the protocol described in ANSI Standard Fibre Channel (FC) Physical and Signaling Interface-3 X3.303: 1998 Specification. If circuitry 38 and storage 27 exchange data and/or commands via one or more links 44 in accordance with iSCSI protocol, the iSCSI protocol may comply and/or be compatible with the protocol described in Satran, "iSCSI," Internet-Draft Specification, draft-ietf-ips-iscsi-19, IP Storage Working Group of the Internet Engineering Task Force, published Nov. 3, 2002, by the Internet Engineering Task Force, Internet Engineering Task Force Secretariat c/o Corporation for National Research Initiatives, 1895 Preston White Drive, Suite 100, Reston, Va. 20191, United States of America. If circuitry 38 and storage 27 exchange data and/or commands via one or more links 44 in accordance with SAS protocol, the SAS protocol may comply and/or be compatible with the protocol described in "Information Technology—Serial Attached SCSI (SAS)," Working Draft American National Standard of International Committee For Information Technology Standards (INCITS) T10 Technical Committee, Project T10/ 1562-D, Revision 2b, published 19 Oct. 2002, by American National Standards Institute. If circuitry 38 and storage 27 exchange data and/or commands via one or more links 44 in accordance with S-ATA protocol, the S-ATA protocol may comply and/or be compatible with the protocol described in "Serial ATA: High Speed Serialized AT Attachment," Revision 1.0, published on Aug. 29, 2001 by the Serial ATA Working Group. If circuitry 38 and storage 27 exchange data and/or commands in accordance with Ethernet protocol, the Ethernet protocol may comply or be compatible with one or more of the wireless communication protocols described Institute of Electrical and Electronics Engineers, Inc. (IEEE) Std. 802.11a-1999, published 1999, IEEE Std. 802.11b-1999, published 1999, IEEE Std. 802.11g-2003, published 2003, and/or other IEEE Std. 802.11x; alternatively or additionally, the Ethernet protocol may comply or be compatible with the protocol described in, for example, IEEE Std. 802.3, 2000 Edition, published on Oct. 20, 2000. If circuitry 38 and storage 27 exchange data and/or commands via one or more links 44 in accordance with TCP/IP, the TCP/IP may comply or be compatible with the protocols described in Internet Engineering Task Force (IETF) Request For Comments (RFC) 791 and 793, published September 1981. Of course, alternatively or additionally, circuitry 38 and storage 27 may exchange data and/or commands via one or more other and/or additional protocols without departing from this embodiment.

In this embodiment, circuitry 38 may comprise data integrity verification circuitry 46. Circuitry 46 may comprise logical exclusive-or (XOR) engine circuitry and block guard processing circuitry 42.

RAID 29 may comprise respective sets 52A . . . 52N of data blocks that are associated with each other in accordance with the RAID technique implemented in RAID 29. For example, in this embodiment, set 52A may comprise blocks 54A . . . 54N stored in storage devices 28A . . . 28N, respectively, and block 56 stored in storage device 50; set 52N may comprise blocks 58A . . . 58N stored in storage devices 28A . . . 28N, respectively, and block 62 stored in storage device 50. Each of the blocks 54A . . . 54N and 58A . . . 58N may comprise a respective user data block and a respective associated data block guard.

For example, in this embodiment, block 54A may comprise a user data block 76A and a data block guard 64A that may be associated with block 76A. Block 54B may comprise a user data block 76B and a data block guard 64B that may be associated with block 76B. Block 54N may comprise a user data block 76N and a data block guard 64N that may be associated with block 76N. Block 56 may comprise a check data block 78 and a data block guard 66 that may be associated with check data block 78. In this embodiment, check data block 78 may comprise syndrome data.

Each of the user data blocks 76A, 76B, . . . 76N and check data block 78 comprised in set 52A may be associated with each other in accordance with the RAID techniques implemented in RAID 29. For example, in this embodiment, check data block 78 may be generated by circuitry 38, based at least in part upon these RAID techniques and the user data blocks 76A, 76B, . . . 76N in set 52A. More specifically, in this embodiment, check data block 78 may be or comprise parity data generated by circuitry 38, in accordance with such RAID techniques, as the result of a logical XOR operation involving, as operands, the user data blocks 76A, 76B, . . . 76N.

Each respective data block guard 64A . . . 64N in set 52A may comprise respective check data and one or more respective tags associated with the respective user data block with which the respective data block guard is associated. Data block guard 66 in set 52A may comprise check data and one or more tags associated with check data block 78. For example, in this embodiment, data block guard 64A may comprise respective check data 80A, and one or more respective tags 84A, that may be associated with user data block 76A. Data block guard 64B may comprise respective check data 80B, and one or more respective tags 84B, that may be associated with user data block 76B. Data block guard 64N may comprise respective check data 80N, and one or more respective tags 84N, that may be associated with user data block 76N. Data block guard 66 may comprise respective check data 82, and one or more respective tags 86, that may be associated with check data block 78.

In this embodiment, check data 80A, 80B, . . . 80N may comprise respective CRC values generated based at least in part upon user data blocks 76A, 66B, . . . 76N, respectively. Check data 82 may comprise a CRC value generated based at least in part upon check data block 78. The one or more respective tags 84A . . . 84N comprised in block guards 64A . . . 64N, respectively, may comprise one or more symbols and/or values that may identify, at least in part, the user data blocks 76A, 76B, . . . 76N, respectively, which block guards 64A . . . 64N may be associated. One or more respective tags 86 may comprise one or more symbols and/or values that may identify, at least in part, check data block 78.

For example, in this embodiment, block 58A may comprise a user data block 72A and a data block guard 68A that may be associated with block 72A. Block 58B may comprise a user data block 72B and a data block guard 68B that may be associated with block 72B. Block 58N may comprise a user data block 72N and a data block guard 68N that may be associated with block 72N. Block 62 may comprise a check data block 74 and a data block guard 70 that may be associated with check data block 74. In this embodiment, check data block 74 may comprise syndrome data.

Each of the user data blocks 72A, 72B, . . . 72N and check data block 74 comprised in set 52N may be associated with each other in accordance with the RAID techniques implemented in RAID 29. For example, in this embodiment, check data block 74 may be generated by circuitry 38, based at least in part upon these RAID techniques and the user data blocks 72A, 72B, . . . 72N in set 52N. More specifically, in this embodiment, check data block 74 may be or comprise parity data generated by circuitry 38, in accordance with such RAID techniques, as the result of a logical XOR operation involving, as operands, the user data blocks 72A, 72B, . . . 72N.

Each respective data block guard 68A . . . 68N in set 52N may comprise respective check data and one or more respective tags associated with the respective user data block with which the respective data block guard is associated. Data block guard 70 in set 52N may comprise check data (e.g., CRC guard) and one or more tags associated with check data block 74. For example, in this embodiment, data block guard 68A may comprise respective check data 88A, and one or more respective tags 92A, that may be associated with user data block 72A. Data block guard 68B may comprise respective check data 88B, and one or more respective tags 92B, that may be associated with user data block 72B. Data block guard 68N may comprise respective check data 88N, and one or more respective tags 92N, that may be associated with user data block 72N. Data block guard 70 may comprise respective check data 90, and one or more respective tags 94, that may be associated with check data block 74.

In this embodiment, check data 88A, 88B, . . . 88N may comprise respective CRC values generated based at least in part upon user data blocks 72A, 72B, . . . 72N, respectively. Check data 90 may comprise a CRC value generated based at least in part upon check data block 74. The one or more respective tags 92A . . . 92N comprised in block guards 68A . . . 68N, respectively, may comprise one or more symbols and/or values that may identify, at least in part, the user data blocks 72A, 72B, . . . 72N, respectively, which block guards 68A . . . 68N may be associated. One or more respective tags 94 may comprise one or more symbols and/or values that may identify, at least in part, check data block 74.

As used herein, "check data" means first data generated based at least in part upon second data and from which (1) the second data may be regenerated, at least in part, and/or (2) integrity of the second data may be verified, at least in part. For example, in this embodiment, check data may comprise parity data, syndrome data, and/or CRC data. Also, in this embodiment, "verifying integrity" of data means determining whether one or more errors are present in the data and/or whether one or more portions of the data are invalid, such as, for example, in this embodiment, may result if one or more erroneous and/or invalid bits are present in the data. As used herein, a "block" of data means data that is capable of being addressed, referred to, and/or identified as a unit, such as, for example, in this embodiment, a logical or physical block of data. As used herein, a "portion" of data may comprise some or all of the data. As used herein, "data" may comprise data and/or one or more commands.

Figure 2:
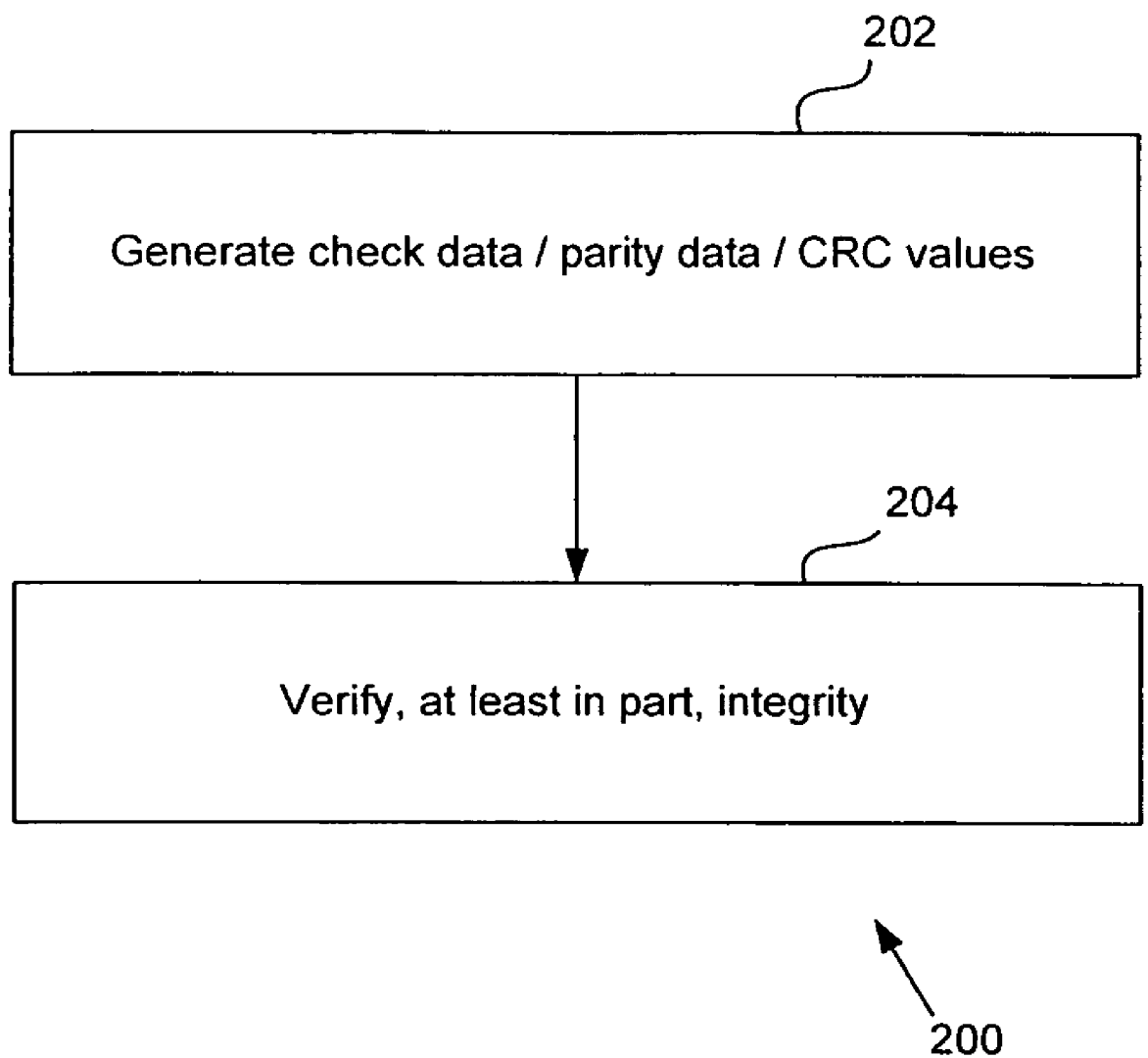
FIG. 2 is a flowchart illustrating operations that may be performed according to an embodiment.

With reference now being made to FIG. 2, operations 200 will be described that may be performed in accordance with an embodiment. After, for example, a reset of system 100, host processor 12 may issue to circuitry 38 a request that circuitry 38 overwrite user data block 76A with user data block 60. In response, at least in part to this request, verification circuitry 46 and/or circuitry 42 may generate, as part of operation 202 illustrated in FIG. 2, check data (e.g., a CRC value) 152 based upon, at least in part, data block 60 and one or more conventional CRC generation algorithms.

Also in response to the request from host processor 12, circuitry 38 may request that storage 27 retrieve and provide to circuitry 38 the respective check data 80B . . . 80N that may have been previously generated, as part of operation 202 shown in FIG. 2, by circuitry 38 (e.g., by verification circuitry 46 and/or circuitry 42) based upon respective user data blocks 76B . . . 76N and, for example, these one or more conventional CRC generation algorithms. This may result in storage 27 retrieving, and providing to circuitry 38 via one or more links 44 respective check data 80B . . . 80N. Circuitry 38 also may request that storage 27 retrieve and provide to circuitry 38 data blocks 76B . . . 76N. This may result in storage 27 retrieving, and providing to circuitry 38 via one or more links 44 data blocks 76B . . . 76N.

In this embodiment, as part of operation 202, circuitry 40 may generate new check data (e.g., in this embodiment, new syndrome data) to overwrite check data 78. Circuitry 40 may generate, as this new check data, new RAID parity data that is the result of a logical XOR operation that involves, as operands, each of user data blocks 60 and 76B . . . 76N. After this new check data has been generated by circuitry 40, circuitry 42 may generate, based upon at least in part upon this new check data and one or more conventional CRC generation algorithms, additional new check data to overwrite check data 82.

After circuitry 40 has generated the new RAID parity data to overwrite check data 78, and circuitry 42 has generated the new check data to overwrite check data 82, circuitry 46 may verify, at least in part, integrity of this new RAID parity data and/or the user data blocks 60 and 76B . . . 76N, as illustrated by operation 204 in FIG. 2. In this embodiment, circuitry 46 may base, at least in part, this verification of the integrity of the new RAID parity data, new check data, and/or the user data blocks 60 and 76B . . . 76N, upon check data 150 generated, at least in part, by circuitry 40 and the new check data that is to overwrite check data 82.

More specifically, in this embodiment, as part of operation 202, prior to executing operation 204, circuitry 40 may generate, as check data 150, the result of a logical XOR operation that involves, as operands, each of the respective check data 152 and 80B . . . 80N. Thereafter, as part of operation 204, circuitry 46 and/or circuitry 42 may compare check data 150 with the new check data 152 that is to overwrite check data 82 in order to determine whether check data 150 matches the new check data 152 that is to overwrite check data 82. If circuitry 46 and/or circuitry 42 determine that check data 150 matches the new check data that is to overwrite check data 82, circuitry 46 may determine, as a result of operation 204, that the new RAID parity data, new check data, and the user data blocks 60 and 76B . . . 76N have integrity (e.g., that they lack errors and/or are not invalid). Thereafter, if, as a result of operation 204, circuitry 46 determines that the new RAID parity data, new check data, and the user data blocks 60 and 76B . . . 76N have integrity, circuitry 38 may issue to storage 27 a request that storage 27 overwrite user data block 76A with user data block 60, overwrite respective check data 80A with check data 152, overwrite check data 82 with the new check data, and overwrite check data 78 with the new RAID parity data. In response to this request, storage 27 may overwrite user data block 76A, respective check data 80A, check data 82, and check data 78 in accordance with the request.

Conversely, if circuitry 46 and/or circuitry 42 determine that check data 150 does not match the new check data that is to overwrite check data 82, circuitry 46 may determine, as a result of operation 204, that the new RAID parity data, new check data, and/or the user data blocks 60 and 76B . . . 76N lack integrity (e.g., that they contain one or more errors and/or are invalid). Thereafter, circuitry 38, circuitry 46, and/or circuitry 42 may undertake appropriate action to correct and/or ameliorate this condition, including, for example, re-calculating each the respective check data 152, 80B . . . 80N, and the new check data that was to overwrite check data 82, and comparing the re-calculated check data with the previously calculated respective corresponding check data to determine the new RAID parity data and/or the data blocks 60 and 76B . . . 76N that may lack integrity.

Thus, a system embodiment may comprise a circuit board that comprises a bus interface, and a circuit card capable of being inserted into the bus interface. The circuit card may comprise circuitry that may be capable of verifying, at least in part, based at least in part, upon second check data and third check data, integrity of first check data and a plurality of data blocks. The first check data may be generated based at least in part upon the plurality of data blocks. The second check data may be generated based at least in part upon respective check data. The respective check data may be generated based at least in part upon respective data blocks comprised in the plurality of data blocks. The third check data may be generated based at least in part upon the first check data.

Advantageously, these features of this system embodiment may permit the circuitry of this system embodiment to be able to verify the integrity of the data blocks faster than the aforesaid conventional data storage arrangement may be able to verify the integrity of the data blocks. Further advantageously, the circuitry of this system embodiment may be less complex than the combination of the first and second circuitry in the aforesaid conventional data storage arrangement.

The terms and expressions which have been employed herein are used as terms of description and not of limitation, and there is no intention, in the use of such terms and expressions, of excluding any equivalents of the features shown and described (or portions thereof), and it is recognized that various modifications, variations, alternatives, and equivalents are possible within the scope of the claims. Accordingly, the claims are intended to cover all such modifications, variations, alternatives, and equivalents.

What is claimed is:

1. A method comprising:
    verifying, at least in part, an integrity of first check data and a plurality of data blocks, the first check data being generated based at least in part upon the plurality of data blocks, the verifying being based, at least in part, upon second check data and third check data, the second check data being generated based at least in part upon respective check data, the respective check data being generated based at least in part upon respective data blocks comprised in the plurality of data blocks, the third check data being generated based at least in part upon the first check data, wherein the verifying is further based at least in part upon comparison of the second check data with the third check data.

2. The method of claim 1, further comprising:
    generating the second check data and the third check data; and
    generating the respective check data.

3. The method of claim 1, wherein:
the first check data comprises parity data; and
the method further comprises generating the parity data, the generating of the parity data comprising performing a logical exclusive-or operation that involves, as operands, each of the respective data blocks comprised in the plurality of data blocks.

4. The method of claim 1, wherein:
the second check data is generated based at least in part a logical exclusive-or of respective CRC values; and
the method further comprises generating the respective CRC values based at least in part upon the respective data blocks comprised in the plurality of data blocks.

5. The method of claim 1, wherein:
the first check data comprises parity data; and
the third check data comprises a cyclic redundancy check value generated based at least in part upon the parity data.

6. A computer-readable medium having stored thereon one or more instructions that, when executed by a computer, perform the following:
verifying, at least in part, an integrity of first check data and a plurality of data blocks, the first check data being generated based at least in part upon the plurality of data blocks, the verifying being based, at least in part, upon second check data and third check data, the second check data being generated based at least in part upon respective check data, the respective check data being generated based at least in part upon respective data blocks comprised in the plurality of data blocks, the third check data being generated based at least in part upon the first check data, wherein the verifying is further based at least in part upon comparison of the second check data with the third check data.

7. The article of claim 6, wherein the instructions when executed also result in:
generating the second check data and the third check data; and
generating the respective check data.

8. The article of claim 6, wherein:
the first check data comprises parity data; and
the instructions when executed also result in generating the parity data, the generating of the parity data comprising performing a logical exclusive-or operation that involves, as operands, each of the respective data blocks comprised in the plurality of data blocks.

9. The article of claim 6, wherein:
the second check data is generated based at least in part a logical exclusive-or of respective CRC values; and
the instructions when executed also result in generating the respective CRC values based at least in part upon the respective data blocks comprised in the plurality of data blocks.

10. The article of claim 6, wherein:
the first check data comprises parity data; and
the third check data comprises a cyclic redundancy check value generated based at least in part upon the parity data.

11. An apparatus comprising: circuitry that is capable of verifying, at least in part, an integrity of first check data and a plurality of data blocks, based at least in part upon second check data and third check data, the first check data being generated based at least in part upon the plurality of data blocks, the second check data being generated based at least in part upon respective check data, the respective check data being generated based at least in part upon respective data blocks comprised in the plurality of data blocks, the third check data being generated based at least in part upon the first check data; wherein the circuitry is capable of verifying the integrity of the plurality of data blocks and the first check data based at least in part upon comparison of the second check data with the third check data.

12. The apparatus of claim 11, wherein the circuitry is also capable of:
generating the second check data and the third check data; and
generating the respective check data.

13. The apparatus of claim 11, wherein:
the first check data comprises parity data; and
the circuitry is also capable of generating the parity data by performing a logical exclusive-or operation that involves, as operands, each of the respective data blocks comprised in the plurality of data blocks.

14. The apparatus of claim 11, wherein:
the second check data is generated based at least in part upon a logical exclusive-or of respective CRC values; and
the circuitry is also capable of generating the respective CRC values based at least in part upon the respective data blocks comprised in the plurality of data blocks.

15. The apparatus of claim 11, wherein:
the first check data comprises parity data; and
the third check data comprises a cyclic redundancy check value generated based at least in part upon the parity data.

16. A system comprising:
a circuit board comprising a bus interface;
a circuit card capable of being inserted into the bus interface, the circuit card comprising circuitry capable of verifying an integrity of first check data and a plurality of data blocks, based at least in part upon second check data and third check data, the first check data being generated based at least in part upon the plurality of data blocks, the second check data being generated based at least in part upon respective check data, the respective check data being generated based at least in part upon respective data blocks comprised in the plurality of data blocks, the third check data being generated based at least in part upon the first check data;
storage to store the plurality of data blocks and the first check data, wherein the circuitry also is capable of generating tags associated with the plurality of data blocks and the first check data, and the storage is capable of storing the tags.

17. The system of claim 16, wherein:
the storage is also capable of storing the respective check data and the third check data;
the respective check data comprises cyclic redundancy check (CRC) values generated based at least in part upon the respective data blocks comprised in the plurality of data blocks; and
the third check data comprises a CRC value generated based at least in part upon the first check data.

18. The system of claim 16, wherein:
the circuit board comprises a processor and a bus, the bus coupling the bus interface to the processor.

19. The system of claim 16, wherein:
the system further comprises storage to store the plurality of data blocks and the first check data.

20. The system of claim 19, wherein:
the storage comprises a redundant array of inexpensive disks (RAID).

* * * * *